March 2, 1965  N. H. ERIKSSON  3,171,603
ARRANGEMENT FOR TILTING THE HEADLIGHTS OF MOTOR VEHICLES
AND THE LIKE FROM A REMOTE CONTROL STATION
Filed Sept. 25, 1962  2 Sheets-Sheet 1

March 2, 1965    N. H. ERIKSSON    3,171,603
ARRANGEMENT FOR TILTING THE HEADLIGHTS OF MOTOR VEHICLES
AND THE LIKE FROM A REMOTE CONTROL STATION
Filed Sept. 25, 1962    2 Sheets-Sheet 2

United States Patent Office 3,171,603
Patented Mar. 2, 1965

3,171,603
ARRANGEMENT FOR TILTING THE HEADLIGHTS OF MOTOR VEHICLES AND THE LIKE FROM A REMOTE CONTROL STATION
Nils Holger Eriksson, Frosundagatan 9, Solna, Sweden
Filed Sept. 25, 1962, Ser. No. 225,998
Claims priority, application Sweden, Sept. 28, 1961, 9,637/61
6 Claims. (Cl. 240—61.8)

The present invention relates to an arrangement for tilting the headlights of a motor vehicle or the like from a control station, for example manually from the driver's position, by means of a movement transmitting hydraulic system of the kind which comprises a number of setting mechanisms each allotted to a corresponding headlight and mechanically coupled therewith, and a double-acting piston-type control pump for supplying liquid to the said mechanisms, said control pump being preferably adapted to be operated manually.

The known arrangements operating with hydraulic movement transmission between the control station and the headlights have the inconvenience that if leakage should occur past the piston or pistons in the control pump a phase displacement will gradually occur between the simultaneous positions of the control pump and the controlled setting mechanisms, so that it will not any longer be possible to conclude from the position of the control pump which positions the headlights simultaneously take up. In other words, the known arrangements do not permit of providing the control pump with a scale on which the exact setting of the headlights can be read.

Said inconvenience has been avoided according to the present invention by combining the control pump with a storage for liquid which communicates with ports provided in the cylinder walls of the pump in positions at least partly in front of the respective position in their entirely retracted positions, so that periodically a free communications is established between the storage of liquid and the cylinder spaces in front of the pistons. In this manner a compensation for a possible leakage past the piston or pistons of the control pump and also for a permanent change in the volume of the connecting hoses is automatically obtained each time said position or positions are moved to their end positions.

A particularly accurate interrelation between the simultaneous positions of the control pump and of the headlights is obtained if the volume of the liquid driven out by a piston of the control pump when the piston is moved from its entirely retracted to its entirely inserted position exceeds slightly the stroke volume of the corresponding sitting mechanism, so that normally the setting mechanism reaches its end position before the piston of the control pump has reached its entirely inserted position. In the case of a manual shifting of the control pump the operator feels when the setting mechanisms have reached their end positions since this condition manifests itself by a resistance being set up against a further shifting movement. If the control pump is moved further to its end position while overcoming said resistance, the excess volume of liquid is taken up by the hose connection through an elastic widening of the hose.

As a rule, the control pump is mounted at the driver's position, for instance on the instrument board, and is adapted to be manually shifted by means of a handwheel or the like, but it may also be placed at other points of the vehicle, for instance so, that it is actuated automatically by the vehicle itself when the vehicle, on account of an uneven loading, tilts too much downwards or upwards from a normal position.

The invention will now be described more closely with reference to the accompanying drawings.

Figure 1:
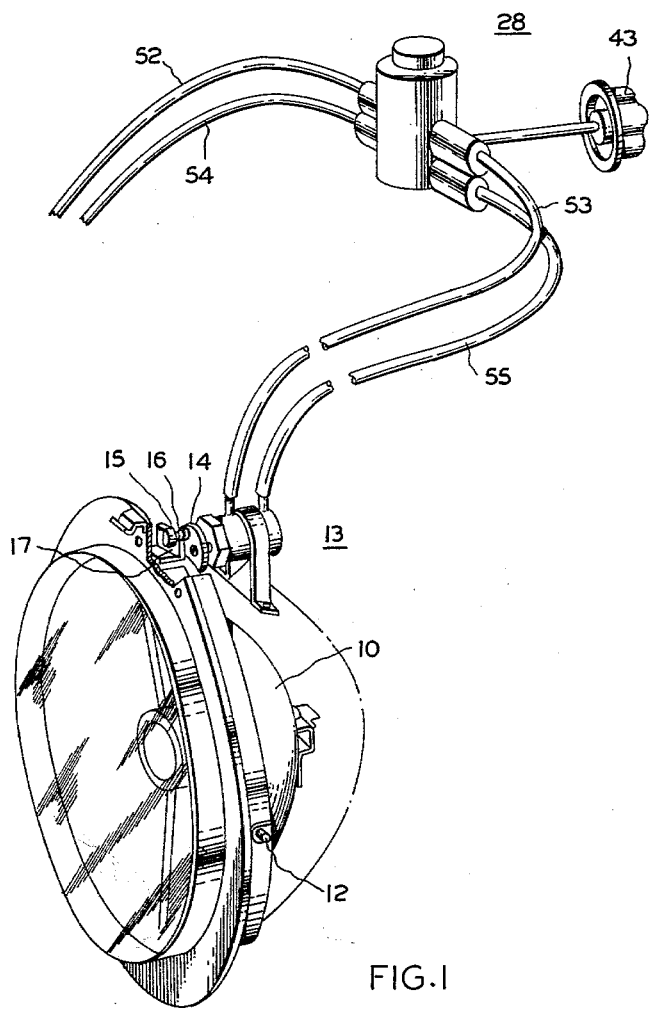
FIGURE 1 shows a perspective view of one of the headlights of a motor vehicle arranged to be tilted from the driver's position with the aid of a hydraulic movement transmitting system in accordance with the invention.

According to FIGURE 1, the reflector 10 of each headlight together with the lamp inserted therein is swingable about a horizontal axis defined by two journals 12. The swinging axis preferably passes through the point of gravity of the reflector unit so that no external force is required for holding the reflector in any setting position. The setting or tilting of the reflector unit is effected by means of a double-acting hydraulic piston forming part of a setting mechanism 13 which is shown more in detail in FIGURE 2. Positioned on the projecting end of the piston rod is a circular disc 14, and in said disc is secured, close to the periphery thereof, an adjusting screw 15 provided with a head. Threaded onto the adjusting screw 15 is a helical spring 16 which is biased when the screw is screwed into position. An upwardly directed flange of an angle piece 17 secured on the reflector 10 engages between the head of the screw 15 and the end of the biased helical spring 16 so that a pivotal connection is obtained between the hydraulic piston and the reflector unit.

Figure 2:
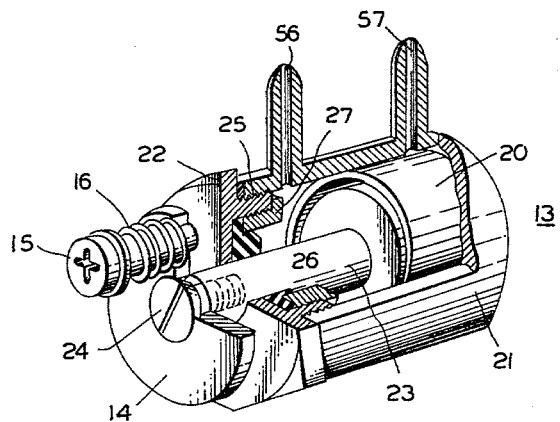
FIGURE 2 shows on a larger scale and partly in section the setting mechanism which is mechanically coupled with the headlight.

According to FIGURE 2, the double-acting piston 20 is slidable in a cylinder 21 which is permanently closed at one end and is closed at the other end by means of a detachable screw cap 22 provided with a central bore through which the cylindrical piston rod 23 projects. At the end of said rod the disc 14 is secured by means of a slotted screw 24. Inserted between the screw cap 22 and the cylinder 21 is a sealing ring 25, whereas sealing against the piston rod is secured by means of a packing 26 which is pressed into engagement with the piston rod and with the cap by a pressing ring 27.

The control mechanism mounted at the driver's position is generally designated 28. According to FIGURE 3, said mechanism comprises an oil housing in the shape of an upright cylinder 29 which is normally closed by means of a tightfitting screw cap 30. Inserted through the cylindrical wall of the oil housing are four horizontal cylinders placed in an axial plane through the oil housing in groups of two and two on axial lines which are parallel with each other. The cylinders of the upper group are designated 31 and 32, and the cylinders of the lower group are designated 33 and 34. Slidable in each cylinder is a piston provided with a sealing ring. The pistons 35 and 36 appertaining to the cylinders of the upper group are rigidly connected together by means of a toothed rod 37 having a cylindrical rear side and the pistons 38 and 39 appertaining to the cylinders of the lower group are coupled together by means of a toothed rod 40. The toothed rods 37 and 40 turn their toothed sides towards each other and cooperate with a toothed wheel 41 which is common to both and is mounted on a spindle 42 which projects through the wall of the oil housing 29 in a liquid-tight manner, a handwheel 43 being mounted on the projecting free end of said spindle. The respective cylinders 31, 32, 33 and 34 communicate through ports 44, 45, 46 and 47 provided in their cylindrical walls with the oil housing 29. The said ports are so positioned that they are at least partly uncovered by the corresponding piston when said piston takes up its entirely retracted position, so that in said position of the piston there is established a free communication between the space in front of the piston and the body of oil in the oil housing, whereas in all other positions of the piston said communication is interrupted. In the closed end of each cylinder is secured a pipe socket 48, 49, 50 or 51, respectively. Threaded onto each pipe socket is a flexible hose 52, 53, 54 or 55 by means of which hoses the control mechanism or pump 28 is connected to the respective mechanisms 13 for tilting the headlights. The hoses 53 and 55 thus lead to and are threaded over connecting sockets 56 and 57 provided on the setting mechanism shown in FIGURE 3.

The various mechanisms may be made wholly of some suitable plastic material, e.g., nylon. Alternatively, the pistons, the piston rods and the toothed rods may be made of metal, and the other parts made of a plastic material of great rigidity. The hoses are preferably made of an elastically yielding plastic material, for instance polyvinyl chloride.

Figure 3:
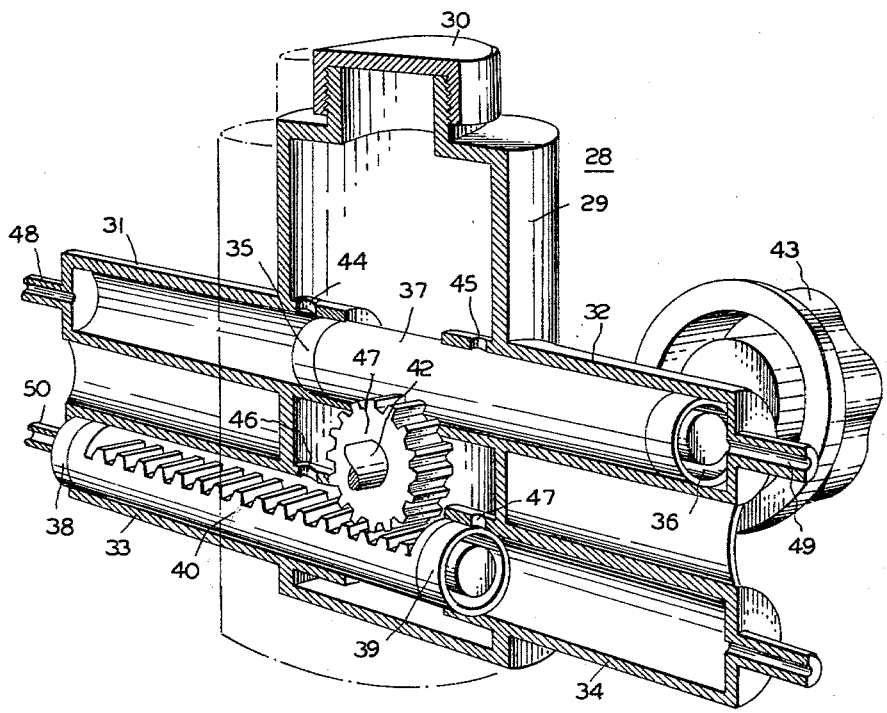
FIGURE 3 shows the control pump, also on a larger scale.

It should be readily understood that when the handwheel 43 is turned to the left in FIGURE 3, the pistons 35 and 36 will move towards the left and the pistons 38 and 39 an equal distance towards the right. The piston 39 then presses oil from the cylinder 34 through the hose 55 to the cylinder 21 of the tilting mechanism behind the piston 20, causing the piston to be displaced to the left while driving out exactly the same amount of oil through the hose 53 to the cylinder 32 of the control mechanism. The movement of the piston 20 causes the reflector unit 10 to be swung counter-clockwise on the journals 12, i.e. the beam of light from the headlight is directed more toward the ground. If the handwheel 43 is then turned back, the reflector unit is swung back to its starting position. The turning of the handwheel 43 to an intermediate position results in a simultaneous tilting of the reflector to a corresponding intermediate position. Since the synchronizing is practically absolute, the control wheel 43 is preferably provided with a graduated scale which indicates in a suitable measure the actual setting position of the headlights.

The cylinders 31 to 34 are preferably given such a length that the volume of oil driven out by the respective pistons on movement of the piston from its inner limit position to its outer limit position slightly exceeds the stroke volume of the double-acting piston 20 in the setting mechanism 13. This involves that the double-acting piston 20 will have reached its end position before the port 45 or 47 at the control mechanism is uncovered by the corresponding piston. During the last portion of the movement of the piston 39 there will thus occur an increase of pressure in the oil which causes an elastic portion of the closed system, e.g. the hose 55, to expand, whereas during the last portion of the movement of the piston 36 a reduction of pressure occurs which causes the hose 53 to reduce its volume elastically. When the port 45 or 47 at the control mechanism is uncovered 29 through the cylinder space in front of the piston 36 out into the house 53 so that the latter can retrieve its original volume, whereas the excess volume of oil which has caused the hose 55 to expand elastically will flow back to the cylinder 32 next time the piston is moved from its entirely inserted position to its entirely retracted position. Thus a possible deviation from the correct interrelation between the positions of the handwheel 43 and the simultaneous setting positions of the headlight reflectors 10 caused by leakage of oil past the piston will automatically become corrected each time the handwheel 43 is turned to its end positions, and it is therefore possible to read on a scale provided at the handwheel the exact corresponding tilting positions of the headlights.

The invention is not restricted to the embodiments disclosed but modifications of different kinds are conceivable without departing from the inventive idea. In particular, the invention comprises all equivalents.

What I claim is:

1. An apparatus for tilting the headlights of a vehicle in a vertical plane from a remote location, comprising:
   (a) an hydraulic fluid reservoir,
   (b) two pairs of piston cylinders, each pair being axially aligned with one another and one pair being spaced above the other, said chambers each having an open end extending part-way into said reservoir and having a port formed near said open end to provide communication between said reservoir and said cylinders,
   (c) a pair of double-ended pistons passing into the open ends of the complementary ones of each pair of said cylinders, each of said pistons being of a length such that a portion of said port of said cylinder is open when the end of said piston is at the end of its non-working stroke, and having teeth formed along the facing center sections of said pistons to form racks,
   (d) a circular tooth gear cooperatively engaging the teeth on said pistons and adapted to drive the two pistons in opposite directions,
   (e) a hand-operable dial, having a scale associated therewith fixedly connected to said circular gear and adapted to turn said circular gear in either direction,
   (f) two pairs of expansible hoses connected to fluid outlets in the free ends of each of said cylinders,
   (g) a third piston cylinder having its ends connected to a pair of said hoses to alternately receive fluid displaced by said first-mentioned pistons,
   (h) a third double-acting piston mounted in said third cylinder and of a size such that the volume of fluid which can enter at either end of said piston is slightly less than the volume of fluid displaceable by each of said first-mentioned pistons, and
   (i) a pair of headlights mounted on horizontal axes and connected to said third piston so as to be pivoted on their axes as said third piston is reciprocated.

2. An apparatus for tilting the headlights of a vehicle in a vertical plane from a remote location, comprising:
   (a) an hydraulic fluid reservoir,
   (b) at least one pair of piston cylinders, each having a port in open communication with the interior of said reservoir near one end thereof,
   (c) a pair of pistons mounted in said cylinders so that said ports in said cylinders are partially open when the piston associated with the cylinder is at the extreme of its non-working stroke,
   (d) motive means for driving said pistons in opposite directions,
   (e) a pair of expansible hoses in open communication with the discharge ends of said cylinders,
   (f) a third piston cylinder having each end in open communication with each of said hoses,
   (g) a double-acting piston mounted in said third cylinder and having a volume such that the volume of fluid which can enter said cylinder at either end of said third piston is slightly less than the volume of fluid displaced by each of said first-mentioned pistons, and
   (h) connecting means for connecting said double-acting piston to a pivotally mounted headlight.

3. An apparatus in accordance with claim 2 wherein the drive means for the first-mentioned pair of pistons is a hand-operable dial having a scale associated therewith.

4. An apparatus in accordance with claim 2 wherein the first-mentioned piston cylinders project part way into the fluid reservoir and the ports in said cylinders are formed in that end which projects into said reservoir.

5. An apparatus in accordance with claim 2 wherein teeth are formed on the said first-mentioned pistons to provide linear racks and the drive means includes a circular-toothed gear cooperatively engaging the racks formed on said pistons.

6. An apparatus in accordance with claim 2 wherein a second pair of piston cylinders is axially aligned with the first pair of piston cylinders and the pistons are double-ended pistons mounted in the aligned ones of said pairs of cylinders.

References Cited by the Examiner

UNITED STATES PATENTS

| | | | |
|---|---|---|---|
| 1,559,204 | 10/25 | Thorel | 240—61.1 |
| 2,410,978 | 11/46 | Kelly | 60—54.5 |
| 2,828,722 | 4/58 | Bohnhoff et al. | 121—130 |
| 2,928,318 | 3/60 | Friday | 88—93 |
| 2,995,013 | 8/61 | Gauldie | 60—545 |
| 3,040,717 | 6/62 | Rumsey | 121—120 |

NORTON ANSHER, Primary Examiner.

EVON C. BLUNK, Examiner.